(No Model.)
G. L. DONOVAN.
CUTTING NIPPERS.
No. 344,641. Patented June 29, 1886.
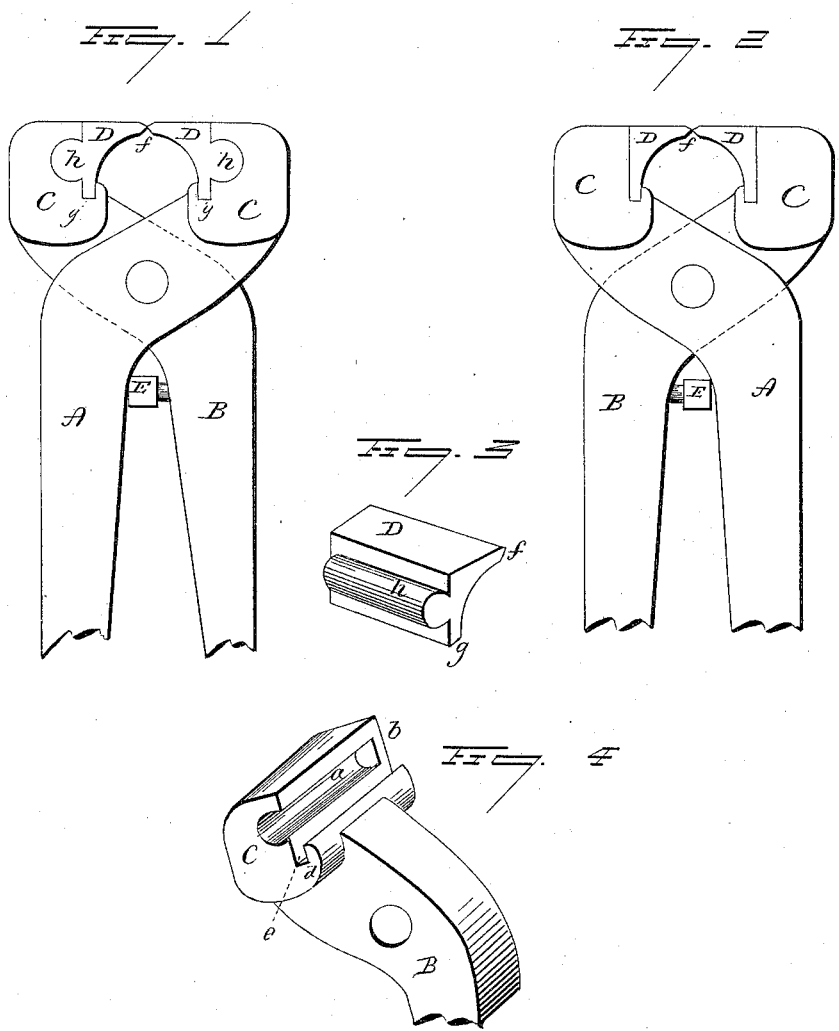

UNITED STATES PATENT OFFICE.

GEORGE L. DONOVAN, OF MERIDEN, CONNECTICUT, ASSIGNOR TO C. ROGERS & BROS., OF SAME PLACE.

CUTTING-NIPPERS.

SPECIFICATION forming part of Letters Patent No. 344,641, dated June 29, 1886.

Application filed May 10, 1886. Serial No. 201,675. (No model.)

*To all whom it may concern:*

Be it known that I, GEORGE L. DONOVAN, of Meriden, in the county of New Haven and State of Connecticut, have invented a new Improvement in Cutting-Nippers; and I do hereby declare the following, when taken in connection with accompanying drawings and the letters of reference marked thereon, to be a full, clear, and exact description of the same, and which said drawings constitute part of this specification, and represent, in—

Figure 1, an end view from the edge the cutters are inserted; Fig. 2, the opposite end view; Fig. 3, a perspective view of the cutter detached; Fig. 4, a perspective view showing the face of the jaw with the cutter removed.

This invention relates to an improvement in cutting-nippers, and particularly to that class of nippers in which the cutters are so arranged in the jaws as to permit them to be removed and others inserted in their place should they become broken or dull. In the more general construction of this class of nippers the cutters are held in position in the jaws by means of a screw or rivet.

The object of this invention is to construct the nippers with removable jaws which will be held in position without screws or other detachable fastening device; and it consists in the construction hereinafter described, and particularly recited in the claims.

A represents one handle, and B the other handle, of the usual construction, and pivoted together to form the bearing upon which the handles may turn in the usual manner. At the upper end of each of the said handles is a jaw, C, the face of the said jaws being parallel. In the face of each of the jaws is a longitudinal groove, a, extending from one side nearly across the face of the jaws, leaving a stop, b, at one end. The said groove is formed of cylindrical shape by drilling into the jaws from one end and near the face, so that the groove shall be somewhat more than half a circle in transverse section and open on the face.

Below the groove a is an inward projection, d, in the upper side of which is a groove, e, parallel with the groove a, and which extends entirely across the jaws.

D represents the cutters, the back of each corresponding to the face of the respective jaws. The face of each cutter is curved inward, forming the cutting-edge f, and a lip, g, upon the lower edge, the said lip g corresponding to the groove e in the jaws. On the back of each of the cutters is a cylindrical rib, h, corresponding in shape to the groove a in the face of the jaws, and extends nearly across the back—that is, in length corresponding to the length of the groove a.

The cutters are placed in the jaws from the open end, the rib h entering the groove a, and the lip g entering the groove e, the end of the rib h resting against the stop b, and because of the cylindrical shape of the groove a and the rib h the cutter is securely held in position without the aid of a screw or other fastening device.

If desired, the groove a may extend entirely across the face of the jaws, and the rib h extend from end to end of the cutter, as indicated in broken lines.

The nippers are provided with the usual adjustable stop, as at E, to regulate the closing of the jaws.

The cutters may be cut from bars rolled to the required shape, and the jaws cast or forged to correspond to said shape.

I claim—

1. The herein-described cutting-nippers, consisting of the handles A B, pivoted together, and each constructed with a jaw, the face of said jaws constructed with a cylindrical longitudinal groove, a, extending nearly across the face of the jaw, forming a stop at one end, and with a groove, e, below and parallel with the groove a, combined with the cutters D, constructed with a cylindrical rib, h, corresponding to the groove a, and with the lip g, corresponding to the groove e, and with the cutting-edge f, substantially as described.

2. The combination of the handles A B, pivoted together, and each constructed with a jaw, C, said jaws constructed with a cylindrical longitudinal groove, a, and with an angular groove, e, below and parallel with the groove a, and the cutters D, each constructed with a cylindrical rib, h, corresponding to the groove a, and with the lip g, corresponding to the groove e, and with the cutting-edge f, substantially as described.

GEO. L. DONOVAN.

Witnesses:
CHAS. J. HINSDALE,
ALBERT H. GRAHAM.